United States Patent
Brehmer

(10) Patent No.: US 11,174,932 B2
(45) Date of Patent: Nov. 16, 2021

(54) BEARING ARRANGEMENT

(71) Applicant: ZF Friedrichshafen AG, Friedrichshafen (DE)

(72) Inventor: Martin Brehmer, Tettnang (DE)

(73) Assignee: ZF FRIEDRICHSHAFEN AG, Friedrichshafen (DE)

(*) Notice: Subject to any disclaimer, the term of this patent is extended or adjusted under 35 U.S.C. 154(b) by 271 days.

(21) Appl. No.: 16/336,605

(22) PCT Filed: Sep. 12, 2017

(86) PCT No.: PCT/EP2017/072803
§ 371 (c)(1),
(2) Date: Mar. 26, 2019

(87) PCT Pub. No.: WO2018/059925
PCT Pub. Date: Apr. 5, 2018

(65) Prior Publication Data
US 2019/0234506 A1    Aug. 1, 2019

(30) Foreign Application Priority Data

Sep. 28, 2016 (DE) ...................... 10 2016 218 762.7

(51) Int. Cl.
*F16H 57/021* (2012.01)
*B60K 6/48* (2007.10)
(Continued)

(52) U.S. Cl.
CPC ............. *F16H 57/021* (2013.01); *B60K 6/40* (2013.01); *B60K 6/48* (2013.01); *F16C 17/02* (2013.01);
(Continued)

(58) Field of Classification Search
CPC ....... F16H 57/021; F16H 57/082; B60K 6/48; B60K 6/40; B60K 2006/4825; F16C 17/02; F16C 17/04; F16C 2326/06; Y02T 10/62

See application file for complete search history.

(56) References Cited

U.S. PATENT DOCUMENTS

| 5,443,130 A | 8/1995 | Tanaka et al. |
| 7,690,454 B2 | 4/2010 | Rose |

(Continued)

FOREIGN PATENT DOCUMENTS

| DE | 102010036243 A1 | 3/2012 |
| DE | 102012212268 A1 | 5/2014 |

(Continued)

OTHER PUBLICATIONS

International Search Report (English Translation) PCT/EP2017/072803, dated Dec. 6, 2017. (2 pages).

(Continued)

Primary Examiner — Victor L MacArthur
(74) Attorney, Agent, or Firm — Dority & Manning, P.A.

(57) ABSTRACT

A bearing assembly includes a shaft, a transmission gearing which is operatively connected to the shaft and is operatively connectable to an input shaft of a main transmission, and a first and a second bearing for supporting the shaft. The bearing assembly is characterized in that the first bearing and the second bearing are arranged in an area of the bearing assembly which extends in a direction from a plane oriented normal to an axis of the transmission gearing.

20 Claims, 2 Drawing Sheets

(51) Int. Cl.
   *B60K 6/40*   (2007.10)
   *F16C 17/02*  (2006.01)
   *F16C 17/04*  (2006.01)
   *F16H 57/08*  (2006.01)

(52) U.S. Cl.
   CPC ........... *F16C 17/04* (2013.01); *F16H 57/082* (2013.01); *B60K 2006/4825* (2013.01); *F16C 2326/06* (2013.01); *Y02T 10/62* (2013.01)

(56) References Cited

U.S. PATENT DOCUMENTS

| | | | |
|---|---|---|---|
| 9,033,837 B2 | 5/2015 | Smetana et al. | |
| 9,638,302 B2 | 5/2017 | Smetana et al. | |
| 2012/0031691 A1* | 2/2012 | Fuechtner | B60K 1/00 180/65.6 |
| 2013/0086798 A1 | 4/2013 | Frait et al. | |
| 2017/0184191 A1* | 6/2017 | Fuhrer | F16H 57/021 |
| 2020/0158212 A1* | 5/2020 | Brehmer | F16H 57/0476 |

FOREIGN PATENT DOCUMENTS

| | | |
|---|---|---|
| DE | 102014202621 A1 | 8/2015 |
| EP | 2117869 B1 | 7/2010 |
| JP | 2005212494 A | 8/2005 |
| JP | 2009220771 A | 10/2009 |

OTHER PUBLICATIONS

German Search Report DE102016218762.7, dated Jun. 28, 2019. (14 pages).

* cited by examiner

BEARING ARRANGEMENT

FIELD OF THE INVENTION

The invention relates generally to a bearing assembly for a main transmission of a motor vehicle, including a shaft, a transmission gearing which is operatively connected to the shaft and is operatively connectable to an input shaft of the main transmission, and a first and a second bearing for supporting the shaft.

In addition, the invention relates generally to a transmission including such a bearing assembly and to a motor vehicle including the bearing assembly or the transmission.

BACKGROUND

A multitude of hybrid transmissions is known from the prior art, which are utilized in hybrid vehicles. Hybrid transmissions often have the problem that the torque output by the electric machine or the power does not suffice for the desired driving operation and, therefore, there is a need to increase the torque or the power of the electric machine. This can be implemented by utilizing a larger electric machine. However, the predefined installation space is limited, which limits the size of the electric machine. In order to nevertheless increase the torque or the power, it is known to operatively connect the electric machine to the input shaft of the main transmission with the aid of a transmission gearing.

DE 10 2014 202 621 A1 discloses a transmission including a hybrid module and a main transmission. A shaft which is rotationally fixed to the electric machine of the hybrid module is operatively connected to the input shaft of the main transmission with the aid of a planetary transmission. The shaft is supported by two bearings which are positioned opposite one another relative to the planetary transmission. The transmission has the disadvantage that it requires a great deal of effort to assemble.

SUMMARY OF THE INVENTION

Examples aspects of the invention provide a bearing assembly, with the aid of which the transmission can be assembled in an easy way.

Examples aspects of the invention provide a bearing assembly of the type mentioned at the outset, wherein the first bearing and the second bearing are situated in an area of the bearing assembly, which extends from a plane normal to the axis of the transmission gearing in the same direction.

The bearing assembly according to example aspects of the invention offers the advantage that the transmission gearing and the shaft can be assembled together with the main transmission in a simple way, since, in contrast to the bearings known from the prior art, the bearing does not need to reach over the transmission gearing in order to achieve a sufficient bearing base. Instead, both bearings are arranged in the same area. In addition, the bearing assembly includes an exact and wide bearing base, which advantageously affects the bearing efficiency.

A main transmission which does not belong to the bearing assembly refers, in this case, in particular, to a multi-stage main transmission, in which a predefined number of gears, i.e., fixed transmission ratios between the input shaft and a main transmission output shaft, are engagable with the aid of shift elements. Such main transmissions are utilized primarily in motor vehicles in order to adapt the rotational speed and torque output capacity of the motor vehicle drive unit to the driving resistances of the vehicle in a suitable way.

A shaft is not to be understood in the following exclusively as a, for example, cylindrical, rotatably mounted machine element for transmitting torques, but rather is to be understood to also be general connecting elements which connect individual components or elements to one another, in particular, connecting elements which connect multiple elements to one another in a rotationally fixed manner.

The plane normal to the axis of the transmission gearing is a plane which is perpendicular to a central axis of the transmission gearing. The transmission gearing may be arranged in such a way that the central axis of the transmission gearing is coaxial to a central axis of the input shaft of the main transmission.

The direction along which the area of the bearing assembly extends from the plane normal to the axis may extend in parallel to the central axis of the transmission gearing. The first and/or the second bearing(s) may be designed as plain bearing(s) and/or may radially support the shaft, in particular exclusively.

In one particular embodiment, there may be no bearing for supporting the shaft arranged in another area of the bearing assembly, which extends from the normal to the axis in another direction. This means, the shaft is not supported by any bearings which are not arranged in the aforementioned area. As a result, the bearing assembly can be assembled together with the main transmission in a simple way.

The transmission gearing may be a planetary gear set. Alternatively, the transmission gearing may have gearwheels which are engaged with one another. In one embodiment of the transmission gearing of the planetary gear set, a ring gear may be rotationally fixed to the shaft. A carrier may be rotationally fixed to the input shaft of the main transmission and a sun gear may be rotationally fixed to a housing component of the main transmission, such as a centering plate. The third bearing may axially support the carrier of the planetary transmission.

The transmission gearing may be designed in such a way that the transmission gearing has a ratio of 1.6. Therefore, the shaft has a 1.6-fold higher rotational speed than the input shaft. Alternatively, the transmission gearing may be designed in such a way that the ratio is 1.5. A ratio of 1.6 is advantageous, since the transmission gearing is designed to be smaller in the radial direction as compared to a ratio of 1.5. Therefore, more installation space remains for providing further components, such as a sensor unit, for example, a speed sensor, with the aid of which the rotational speed of a component of the transmission gearing, in particular of the ring gear, and/or of the shaft can be determined.

An inner diameter of the first and/or the second bearing(s) may be smaller than an outer diameter of the transmission gearing. In particular, in an embodiment of the transmission gearing as a planetary gear set, the inner diameter of the first and the second bearings may be smaller than the outer diameter of the carrier or the outer diameter of the planet gears mounted on the carrier. In the end, both bearings may be designed having small dimensions.

In addition, the bearing assembly may include a third bearing and a fourth bearing for supporting the shaft. In this case, the third and/or the fourth bearing(s) may axially support the shaft, in particular exclusively. This means, the shaft may be supported in the radial direction by the first and the second bearings and in the axial direction by the third and the fourth bearings. As a result, the shaft can be supported in a very particularly simple way.

In addition to axially supporting the shaft, the third bearing may also axially support at least one component of the transmission gearing, in particular exclusively. As a result, the third bearing can be utilized for simultaneously supporting two structural components of the bearing assembly.

In one particular embodiment, the bearing assembly may include an electric machine which is operatively connected to the shaft. This can be implemented in that a rotor of the electric machine is connected to the shaft via a rotationally fixed connection, such as a spline, or via another transmission gearing. Such a bearing assembly may be designed as a hybrid module, which offers the advantage that a transmission can be assembled in a simple way. Thus, the hybrid module can be assembled before being coupled to the main transmission and the hybrid module can be operatively connected, as an entire unit, to the input shaft of the main transmission.

The electric machine has at least a rotationally fixed stator and a rotatably mounted rotor and is configured for converting electrical energy into mechanical energy in the form of rotational speed and torque when operated as a motor and for converting mechanical energy into electrical energy in the form of current and voltage when operated as a generator.

In one very particular embodiment, the first bearing may be arranged in such a way that there is a first bearing plane which encompasses the first bearing and a rotor section of a rotor of the electric machine and/or the second bearing is arranged in such a way that there is a second bearing plane which encompasses the second bearing and another rotor section of the rotor of the electric machine. As a result, it is ensured that the bearing assembly and the hybrid module are designed to be compact in the axial direction.

A transmission which includes the bearing assembly next the main transmission is very particularly advantageous. In this case, a component of the transmission gearing is rotationally fixed to the input shaft. In an embodiment of the transmission gearing as a planetary gear set, the carrier is rotationally fixed to the input shaft.

The rotationally fixed connection may be implemented, in this case, in the form of a spline. A spline is a shaft-hub connection, wherein the torque is transmitted by tooth flanks. The shaft is externally geared for this purpose, while the hub is internally geared. In the unloaded condition, the shaft and the hub may be moved in the axial direction with respect to one another.

In one particular embodiment, the first and the second bearings may rest, in particular directly, against the input shaft. As a result, a simple support of the shaft can be implemented.

The transmission may include one further shaft which is rotationally fixed to the input shaft, in particular, with the aid of a spline. In this case, the engagement of the component of the transmission gearing with the input shaft and the engagement of the further shaft with the input shaft may be spaced apart from one another in the axial direction. This offers the advantage that the loading of the input shaft is distributed to different areas of the input shaft due to the coupling with the shaft and with the further shaft.

The further shaft may be rotationally fixable to a motor vehicle drive unit which does not belong to the transmission, such as an internal combustion engine. In particular, the further shaft may be rotationally fixable to the motor vehicle drive unit with the aid of a shift element, such as a clutch. Alternatively, the further shaft may be rotationally fixed to the motor vehicle drive unit directly, i.e., without the provision of a shift element. The further shaft is utilized for delivering, to the input shaft, not only the torque made available by the electric machine, but also a further torque made available by the motor vehicle drive unit. In this case, the further shaft can carry outer clutch disks of the clutch on the end remote from the input shaft.

The aforementioned shift element and/or a secondary damper may be arranged radially below the rotor of the electric machine and/or in the radial direction between the rotor and the input shaft. As a result, a transmission designed to be compact in the axial direction is possible. In addition, the shift element may be arranged in the axial direction in such a way that there is a plane in which the shift element, the shaft, and the electric machine are arranged.

In one very particular embodiment, a shaft section of the shaft may be arranged in the radial direction between the input shaft and the further shaft. The shaft can at least partially enclose the input shaft. In addition, the further shaft may at least partially enclose the shaft, in particular the shaft section. Due to the aforementioned design and/or arrangement of the shaft, the further shaft, and the input shaft, a compact design of the transmission is possible.

The shaft is enclosed by components, such as the input shaft and the further shaft, having the speed factor 1. This means, the speed ratio between the components is always constant. This is advantageous, in particular, in the embodiment of the first and the second bearings as plain bearings.

The shaft can be axially supported with the aid of the fourth bearing, in particular directly, on the further shaft, in particular exclusively. Therefore, the shaft can be axially supported in a simple way.

The transmission gearing and the shaft may be drivingly connected upstream from the main transmission. In addition, the further shaft may be drivingly connected upstream from the input shaft.

The input shaft may include multiple bore holes for conducting oil. In this case, the oil enters the input shaft via cavities or forged pockets in components, such as a support shaft of the main transmission. The oil flows from the input shaft via the shaft and the further shaft to a piston or a dynamic pressure compensating cavity of the shift element. The oil seal is implemented with the aid of rectangular rings in this case.

The directional information "radially" or "axially" utilized in the description relates to the central axis of the transmission gearing in the case of the bearing assembly. In the case of the transmission, the directional information "radially" or "axially" relates to the central axis of the transmission.

A motor vehicle including a transmission and a motor vehicle drive unit is very particularly advantageous. The motor vehicle drive unit may be rotationally fixable or rotationally fixed to the further shaft.

BRIEF DESCRIPTION OF THE FIGURES

Example aspects of the subject matter of the invention is schematically represented in the figures and is described in the following with reference to the figures, wherein identical or identically operating elements are mostly provided with the same reference characters. Wherein.

DETAILED DESCRIPTION

Figure 1:
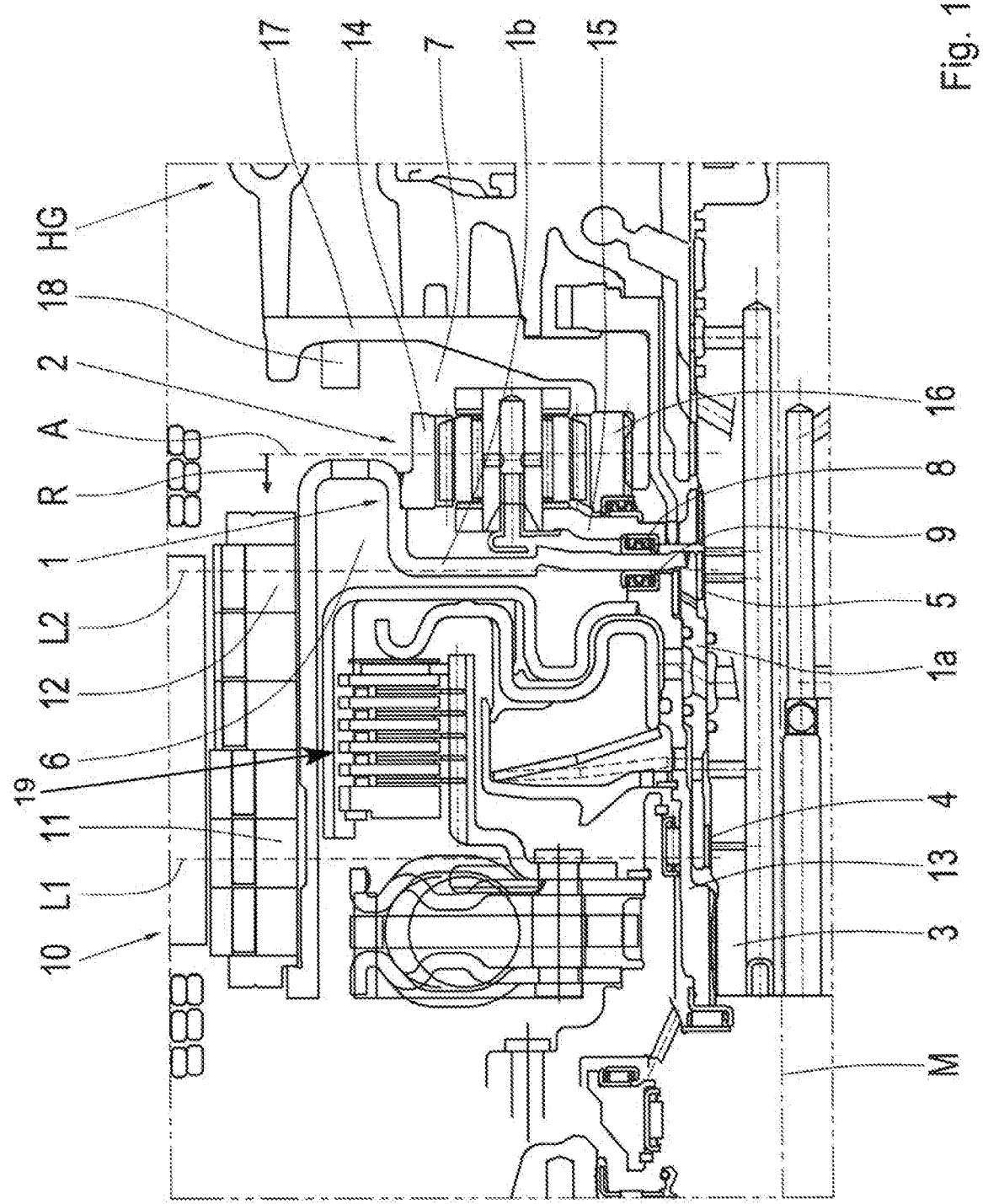
FIG. 1 shows a schematic of a bearing assembly according to the invention, according to a first exemplary embodiment.

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

FIG. 1 shows a transmission including a bearing assembly and a main transmission HG which is operatively connected to the bearing assembly.

The bearing assembly includes a shaft 1, a transmission gearing 2 operatively connected to the shaft 1, and a first bearing 4 and a second bearing 5 for supporting the shaft 1. The transmission gearing 2 is designed as a planetary gear set and is operatively connected to an input shaft 3 of the main transmission HG. The first bearing 4 and the second bearing 5 are arranged in an area 6 of the bearing assembly, which extends from a plane normal to the axis A of the transmission gearing 2 in the same direction R. The planetary transmission has a ratio of 1.6.

The plane normal to the axis A separates a space of the bearing assembly into an area 6, which extends from the plane normal to the axis A in the direction R, and another area 7, which extends from the plane normal to the axis A in another direction, in particular in a direction opposite direction R. The direction R extends in parallel to a central axis of the planetary gear set, which is coaxial to a central axis M of the transmission.

The bearing assembly additionally includes an electric machine 10 which is operatively connected to the shaft 1. In particular, the shaft 1 is rotationally fixed to a rotor of the electric machine 10. In addition, the shaft 1 is rotationally fixed to a ring gear 14 of the planetary gear set.

The carrier 15 of the planetary gear set is rotationally fixed to the input shaft 3 with the aid of a spline. The sun gear 16 of the planetary gear set is rotationally fixed to a housing component 17 of the main transmission HG, such as a centering plate. In this case, the planetary gear set is arranged coaxially to the main transmission. In particular, the planetary gear set is coaxial to a central axis of the input shaft 3 of the main transmission HG, which coincides with the central axis M of the transmission.

The shaft 1 includes a shaft section 1a on the end facing away from the electric machine 10. The shaft section 1a extends in parallel to the central axis M of the transmission and encloses a part of the input shaft 3. The shaft 1 also comprises another shaft section 1b which extends in the radial direction and is rotationally fixed to the shaft section 1a.

The shaft section 1a is supported by the first bearing 4 and the second bearing 5 in the radial direction. In this case, the shaft section 1a rests on the input shaft 3 in the radial direction with the aid of the first bearing 4 and the second bearing 5. In addition, the shaft 1, in particular the other shaft section 1b, is supported in the axial direction by the third bearing 8 and the fourth bearing 9. In this case, the third bearing 8 is arranged in the axial direction between the shaft 1, in particular the other shaft section 1b, and the carrier 15.

The transmission includes one further shaft 13 which is rotationally fixable, with the aid of a shift element 19, to a motor vehicle drive unit which is not represented in FIG. 1. The shift element 19 is arranged in the radial direction between the electric machine 10 and the shaft section 1a. In addition, the shift element 19 and the transmission gearing 2 are positioned opposite one another relative to the other shaft section 1b.

The further shaft 13 is rotationally fixed to the input shaft 3 with the aid of a spline. In this case, the engagement of the further shaft 13 with the input shaft 3 takes place in an area which is spaced apart, in the axial direction, from the engagement area of the carrier 15 with the input shaft 3. The further shaft 13 encloses a part of the shaft section 1a.

The shaft section 1a is arranged in the radial direction between the input shaft 3 and the further shaft 13. The fourth bearing 9 is arranged in the axial direction between the shaft 1, in particular the other shaft section 1b, and the further shaft 13, and supports the shaft 1 in the axial direction on the further shaft 13.

The first bearing 4 is arranged in such a way that there is a first bearing plane L1, in which the first bearing and a rotor section 11 are arranged. The second bearing 5 is arranged in such a way that there is a second bearing plane L2, in which the second bearing 5 and another rotor section 12 are arranged.

The transmission includes a sensor unit 18 for measuring the rotational speed of the shaft 1 and/or the rotational speed of the ring gear 14. The sensor unit 18 is arranged on the housing component 17 of the main transmission HG.

Figure 2:
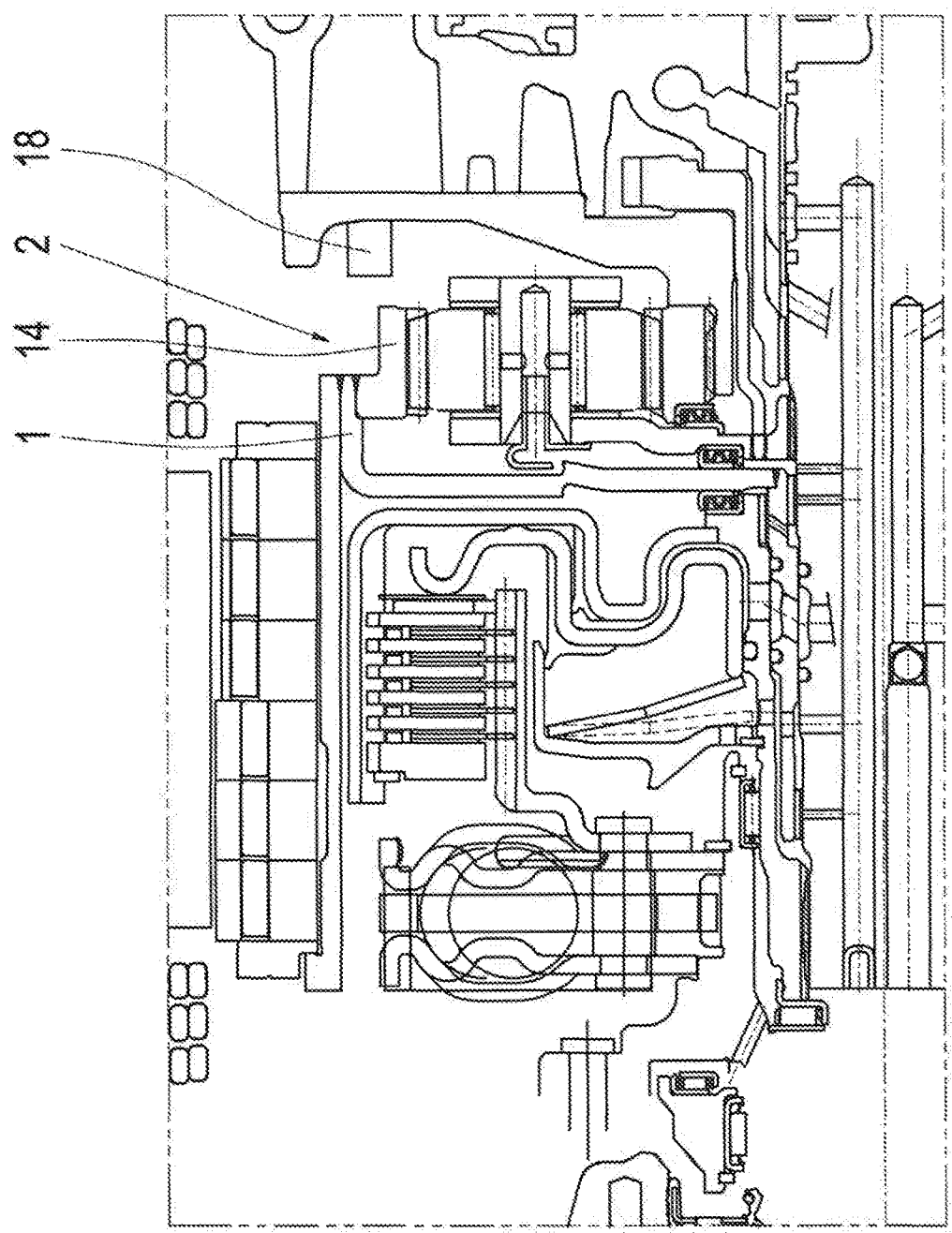
FIG. 2 shows a schematic of a bearing assembly according to the invention, according to a second exemplary embodiment.

FIG. 2 shows a bearing assembly according to a second embodiment. The bearing assembly differs from the bearing assembly represented in FIG. 1 by the design of the transmission gearing 2. The transmission gearing 2 represented in FIG. 2 is likewise embodied as a planetary gear set which is designed in such a way, however, that it has a ratio of 1.5. Due to the lower ratio, the planetary gear set extends further in the radial direction than the planetary gear set represented in FIG. 1. Similarly to the embodiment represented in FIG. 1, a sensor unit 18 for measuring the rotational speed of the shaft 1 and/or the ring gear 14 is also provided in the embodiment represented in FIG. 2.

Modifications and variations can be made to the embodiments illustrated or described herein without departing from the scope and spirit of the invention as set forth in the appended claims.

REFERENCE CHARACTERS 1 shaft
2 transmission gearing
3 input shaft
4 first bearing
5 second bearing
6 area of the bearing assembly
7 other area of the bearing assembly
8 third bearing
9 fourth bearing
10 electric machine
11 rotor section
12 other rotor section
13 further shaft
14 ring gear
15 carrier
16 sun gear
17 housing component
18 sensor unit
19 shift element
1a shaft section
1b other shaft section
A plane normal to the axis
M central axis
R direction
L1 first bearing plane
L2 second bearing plane
HG main transmission

The invention claimed is:

1. A transmission, comprising:
a main transmission (HG); and
a bearing assembly comprising
a first shaft (1),
a transmission gearing (2) operatively connected to the first shaft (1) and operatively connectable to an input shaft (3) of the main transmission (HG), and
a first bearing (4) and a second bearing (5) for supporting the first shaft (1),
wherein the first bearing (4) and the second bearing (5) are arranged in an area (6) of the bearing assembly that extends in a first direction (R) from a plane (A) oriented normal to an axis (M) of the transmission gearing (2),
wherein a component of the transmission gearing (2) is rotationally fixed to the input shaft (3), and
wherein the first bearing (4) and the second bearing (5) rest against the input shaft (3).

2. The transmission of claim 1, wherein no bearing for supporting the first shaft (1) is arranged in another area (7) of the bearing assembly that extends in a second direction from the plane (A) oriented normal to the axis (M), the second direction being opposite the first direction (R).

3. The transmission of claim 1, wherein:
an inner diameter of the first bearing (4) and/or the second bearing (5) is smaller than an outer diameter of the transmission gearing (2); and/or
only one or both of the first bearing (4) and the second bearing (5) radially supports the first shaft (1).

4. The transmission of claim 1, wherein the bearing assembly further comprises a third bearing (8) and a fourth bearing (9) for supporting the first shaft (1), wherein only one or both of the third bearing (8) and the fourth bearing (9) axially supports the first shaft (1).

5. The transmission of claim 4, wherein only the third bearing (8) also axially supports at least one component of the transmission gearing (2).

6. The transmission of claim 1, further comprising an electric machine (10) which is operatively connected to the first shaft (1).

7. The transmission of claim 6, wherein:
the first bearing (4) is arranged such that a first bearing plane (L1) encompasses the first bearing (4) and a rotor section (11) of the electric machine (10); and/or
the second bearing (5) is arranged such a second bearing plane (L2) encompasses the second bearing (5) and another rotor section (12) of the electric machine (10).

8. The transmission of claim 1, wherein the transmission further comprises a second shaft (13) which is rotationally fixed to the input shaft (3).

9. The transmission of claim 8, wherein the first shaft (1) comprises a shaft section (1a) which:
is arranged in a radial direction between the input shaft (3) and the second shaft (13); and/or
is at least partially enclosed by the second shaft (13).

10. The transmission of claim 9, wherein the first shaft (1) at least partially encloses the input shaft (3).

11. The transmission of claim 8, wherein the first shaft (1) axially rests against the second shaft (13) via only the fourth bearing (9).

12. A motor vehicle comprising the transmission of claim 8 and a motor vehicle drive unit, wherein the motor vehicle drive unit is rotationally fixable or rotationally fixed to the second shaft (13).

13. The transmission of claim 1, wherein the transmission gearing (2) and the first shaft (1) are drivingly connected upstream from the main transmission (HG).

14. A transmission, comprising:
a main transmission (HG); and
a bearing assembly comprising
a first shaft (1),
a second shaft (13) rotationally fixed to an input shaft (3) of the main transmission (HG),
a transmission gearing (2) operatively connected to the first shaft (1) and operatively connectable to the input shaft (3), and
a first bearing (4) and a second bearing (5) for supporting the first shaft (1),
wherein the first bearing (4) and the second bearing (5) are arranged in an area (6) of the bearing assembly that extends in a first direction (R) from a plane (A) oriented normal to an axis (M) of the transmission gearing (2),
wherein a component of the transmission gearing (2) is rotationally fixed to the input shaft (3),
wherein the first shaft (1) axially rests against the second shaft (13) via only the fourth bearing (9), and
wherein the first shaft (1) at least partially encloses the input shaft (3).

15. The transmission of claim 14, wherein no bearing for supporting the first shaft (1) is arranged in another area (7) of the bearing assembly that extends in a second direction from the plane (A) oriented normal to the axis (M), the second direction being opposite the first direction (R).

16. The transmission of claim 14, wherein:
an inner diameter of the first bearing (4) and/or the second bearing (5) is smaller than an outer diameter of the transmission gearing (2); and/or
only one or both of the first bearing (4) and the second bearing (5) radially supports the first shaft (1).

17. The transmission of claim 14, wherein the bearing assembly further comprises a third bearing (8) and a fourth bearing (9) for supporting the first shaft (1), wherein only one or both of the third bearing (8) and the fourth bearing (9) axially supports the first shaft (1).

18. The transmission of claim 17, wherein only the third bearing (8) also axially supports at least one component of the transmission gearing (2).

19. The transmission of claim 14, further comprising an electric machine (10) which is operatively connected to the first shaft (1).

20. The transmission of claim 19, wherein:
the first bearing (4) is arranged such that a first bearing plane (L1) encompasses the first bearing (4) and a rotor section (11) of the electric machine (10); and/or
the second bearing (5) is arranged such a second bearing plane (L2) encompasses the second bearing (5) and another rotor section (12) of the electric machine (10).

* * * * *